(12) United States Patent
Prud'Homme Lacroix

(10) Patent No.: US 12,116,113 B2
(45) Date of Patent: Oct. 15, 2024

(54) SKID LANDING GEAR WITH ROLLERS

(71) Applicant: AIRBUS HELICOPTERS, Marignane (FR)

(72) Inventor: Pierre Prud'Homme Lacroix, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 14 days.

(21) Appl. No.: 18/198,707

(22) Filed: May 17, 2023

(65) Prior Publication Data

US 2023/0415884 A1   Dec. 28, 2023

(30) Foreign Application Priority Data

Jun. 24, 2022 (FR) ........................................ 2206284

(51) Int. Cl.
B64C 25/52 (2006.01)

(52) U.S. Cl.
CPC ..................... B64C 25/52 (2013.01)

(58) Field of Classification Search
CPC .................................................... B64C 25/52
See application file for complete search history.

(56) References Cited

U.S. PATENT DOCUMENTS

| 2,641,423 | A | * | 6/1953 | Bassett | ................... B64C 25/52 244/108 |
| 5,860,621 | A | | 1/1999 | Barquet et al. | |
| 11,230,372 | B1 | | 1/2022 | Griffin et al. | |
| 2014/0084109 | A1 | | 3/2014 | Prud Homme-Lacroix | |
| 2015/0151836 | A1 | | 6/2015 | Prud Homme-Lacroix et al. | |
| 2022/0289366 | A1 | * | 9/2022 | Griffin | ................... B64C 25/34 |

FOREIGN PATENT DOCUMENTS

| CN | 216636810 U | 5/2022 |
| EP | 2641831 A1 | 9/2013 |
| EP | 2944567 A1 | 11/2015 |
| FR | 2749561 A1 | 12/1997 |
| FR | 2995874 A1 | 3/2014 |
| FR | 3014079 A1 | 6/2015 |
| JP | H10129597 A | 5/1998 |

OTHER PUBLICATIONS

French Search Report for French Application No. FR2206284, Completed by the French Patent Office, Dated Jan. 9, 2023, 14 pages.

* cited by examiner

*Primary Examiner* — Tye William Abell
(74) *Attorney, Agent, or Firm* — Brooks Kushman P.C.

(57) ABSTRACT

A landing gear provided with at least two first rollers mounted on two first free-wheels respectively connected to a first skid and configured, during a landing phase, to lock in the elastic return direction when the first skid moves in a first direction from the first skid towards a second skid and to be free in the sink direction during movement in a second direction, at least two second rollers being mounted on two respective second free-wheels connected to a second skid and configured, during a landing phase, to lock when the second skid moves in the second direction and to be free during movement in the first direction.

18 Claims, 8 Drawing Sheets

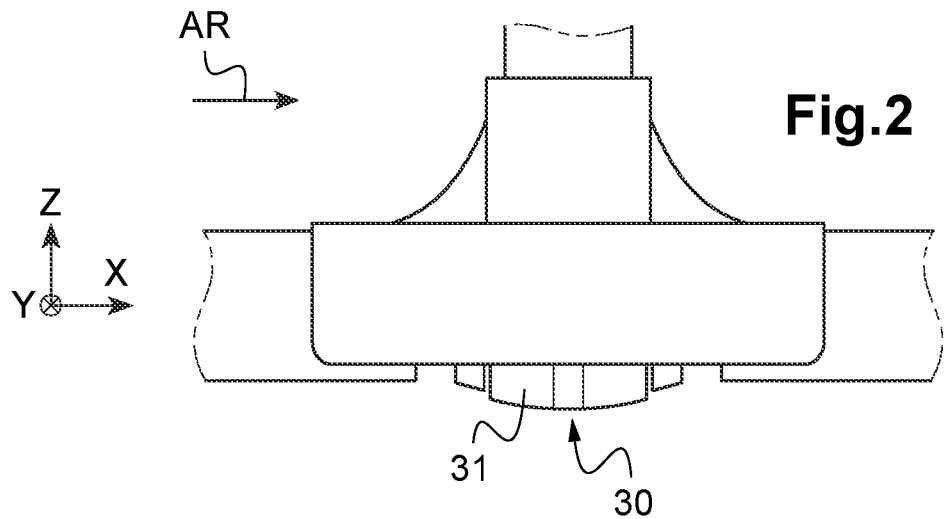
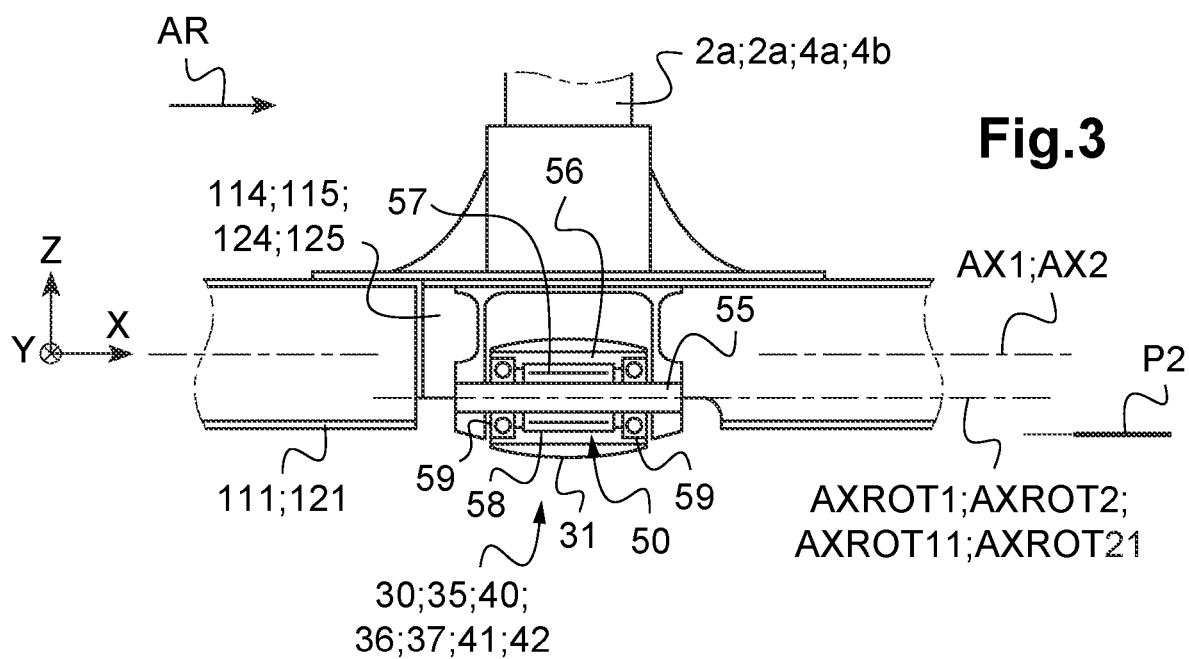

SKID LANDING GEAR WITH ROLLERS

CROSS REFERENCE TO RELATED APPLICATIONS

This application claims priority to French patent application No. FR 22 06284 filed on Jun. 24, 2022, the disclosure of which is incorporated in its entirety by reference herein.

TECHNICAL FIELD

The present disclosure relates to a skid landing gear with rollers, the landing gear being intended for an aircraft such as an aircraft having a rotary wing, for example. In particular, the aircraft may be a drone that may land on the deck of a ship.

BACKGROUND

Conventionally, a rotorcraft comprises a landing gear on which the rotorcraft rests on the ground. One type of landing gear is a skid landing gear provided with a first skid and a second skid intended to be in contact with the ground. The first skid and the second skid are spaced apart from each other transversely, being situated to either side of a longitudinal-vertical plane of symmetry of the landing gear, or indeed of the rotorcraft.

In addition, the skid landing gear is conventionally provided with a first cross-member and a second cross-member for connecting each skid to a structure of a rotorcraft.

Each cross-member comprises a first branch connected to the first skid and to the structure, and a second branch connected to the second skid and to the structure. Each cross-member may be discontinuous, or continuous, comprising a central section connecting the first branch to the second branch.

The first cross-member may be referred to as the "rear cross-member" insofar as this first cross-member is connected to the rear portions of the first and second skids. Conversely, the second cross-member may be referred to as the "front cross-member" because this second cross-member is connected to the front portions of the first and second skids.

Moreover, the first skid is provided with a first longitudinal bearing part, the second skid being provided with a second longitudinal bearing part. The first longitudinal bearing part and the second longitudinal bearing part together define a plane of contact of the landing gear on the ground when the aircraft is on flat ground. Such a contact plane is referred to hereinafter as the "lift plane".

In addition, the landing gear may comprise a first front portion extending longitudinally and upwards away from the first longitudinal bearing part. Similarly, the landing gear may comprise a second front portion extending longitudinally and upwards away from the second longitudinal bearing part. The first and second front portions may be made in one piece and may have similar characteristics to the respective first and second longitudinal bearing parts. The first and second front portions may form part of a front cross-member.

Documents U.S. Pat. No. 2,641,423 and FR 2 749 561 describe skid landing gears.
Document FR 3 014 079 A1 discloses a skid landing gear provided with at least one cross-member with rockers.
Document FR 2 995 874 discloses a skid landing gear provided with a stiffener.
Document EP 2 641 831 discloses a skid fastened to two oscillating cross-member branches.

Moreover, an aircraft provided with a skid landing gear may sometimes be subjected to a bouncing phenomenon during a landing phase. During such a landing phase, the landing gear may store energy by deforming. Some of the energy stored by the landing gear may be released as the applied load factor decreases. This may cause the aircraft to bounce.

According to another aspect, the materials of the skid landing gear components that need to come into contact with the ground may be chosen with relatively low coefficients of friction. These components then do not artificially increase the load factors applied during landing. However, the landing gear may be likely to slide under certain extreme conditions, such as on the deck of a boat in heavy seas, for example. The aircraft may then comprise anchoring systems.

Nevertheless, manually moving an aircraft provided with a skid landing gear may remain challenging when it is on the ground due to the friction of the skids on the ground. Dedicated tools can be used to move a stationary aircraft on the ground, such as trolleys or handling rollers, for example.

Documents CN 216 636 810 U, JP H10 129597 A, U.S. Pat. Nos. 11,230,372 B1, 2,641,423 A, and EP 2 944 567 A1 disclose skid landing gears provided with wheels.

SUMMARY

The object of the present disclosure is therefore to propose an innovative landing gear that makes it possible, in particular, to counter the bouncing phenomenon. Such an innovative landing gear may tend to have optimized stability after landing, and/or be easier for an operator to handle on the ground than a landing gear with conventional skids, and/or limit the wear of the skids compared to the wear of a landing gear with conventional skids, and/or may tend to help prevent a ground resonance phenomenon more effectively.

The disclosure is therefore directed at a landing gear provided with a first skid and a second skid.

The landing gear comprises at least two first ground-contact rollers mounted on two respective first free-wheels that are connected to the first skid, each first free-wheel being configured to lock during an elastic return phase when the first skid moves in a first direction and to be free during a sink phase during movement in a second direction opposite the first direction, the first direction extending from the first skid towards the second skid, the landing gear comprising at least two second ground-contact rollers mounted on two respective second free-wheels that are connected to the second skid, each second free-wheel being configured to lock during the elastic return phase when the second skid moves in the second direction and to be free during the sink phase when the second skid moves in the first direction.

The term "ground-contact" means that the associated rollers are in contact with the ground when the landing gear is resting on the ground. A low point of each roller may therefore lie in a lift plane defined by longitudinal bearing parts of the first and second skids, or indeed below this lift plane during flight.

The expressions "each first free-wheel being configured to lock during an elastic return phase when the first skid moves in a first direction and to be free during a sink phase during movement in a second direction opposite the first direction, the first direction extending from the first skid towards the second skid" and "each second free-wheel being configured to lock during the elastic return phase when the second skid moves in the second direction and to be free during the sink phase when the second skid moves in the first direction" mean that each free-wheel allows the associated roller to rotate intrinsically on itself in a single direction of rotation, and locks the roller when this roller tends to rotate intrinsically in the opposite direction to said single direction of rotation.

The term "on itself" refers to the intrinsic rotation of the roller about its free-wheel and an associated axis of rotation, this axis of rotation being a central axis of the associated free-wheel. The term "rotation" refers hereinafter to the intrinsic rotation of a roller.

The term "nutation angle" refers hereinafter to the angle between the axis of rotation of a roller and a plane, this plane passing through the longitudinal extension axis of the corresponding longitudinal bearing part and being orthogonal to the lift plane of the landing gear. The term "pivoting" used for certain variants refers hereinafter to the pivoting of the free-wheel/roller/axis of rotation arrangement as a whole about a pivot axis in relation to the corresponding skid, pivoting causing the nutation angle to vary.

According to one convention, and hereinafter in the description, this nutation angle may be measured positively in a clockwise direction viewed from above and on the ground for the first rollers fitted to the first skid. In the interest of symmetry, the nutation angle may be measured positively in an anti-clockwise direction viewed from above and on the ground for the second rollers fitted to the second skid. For example, the first skid may be referred to as the "left skid" and the second skid may be referred to as the "right skid" as viewed from behind the landing gear.

The nutation angle of a roller is thus considered to be zero when its axis of rotation is parallel to the longitudinal extension axis of the corresponding longitudinal bearing part, and equal to 90 degrees when its axis of rotation is in a plane orthogonal to the longitudinal extension axis of the corresponding longitudinal bearing part.

During the first phase of a landing, referred to for convenience as the sink phase, the gap between the first skid and the second skid tends to widen. The first skid and the second skid tend to move away from each other, with the cross-members deforming. Following impact with the ground, the first skid moves in the second direction and the second skid moves in the first direction. The rollers roll on the ground, rotating intrinsically about their respective axes of rotation, and do not hinder the movements of the associated skids. The rollers allow the landing gear to be deformed laterally, at least partially elastically.

However, during the second phase of a landing, referred to as the elastic return phase, the landing gear tends to return to its stable shape, releasing the energy accumulated during the previous deformation of the landing gear. The free-wheels tend to prevent the rollers from rotating on themselves. Due to the coefficient of friction between the roller tires and the ground, the rollers tend to slow down the elastic return of the skids, that tends to reduce bouncing, or even prevent it from occurring. The landing gear can be returned to its stable position gradually, or an operator can intervene to unlock at least one roller per skid, by releasing the free-wheels or by using an external tool to relieve the vertical force applied to the landing gear.

Moreover, depending on the embodiment and as described below, these rollers may make it easier to maneuver the landing gear on the ground and/or help keep the landing gear in position on slippery ground and, for example, on the deck of a ship.

The landing gear may further comprise one or more of the following features, taken individually or in combination.

According to one possibility, the landing gear may comprise a front cross-member provided with a first front descending branch connected to the first skid and a second front descending branch connected to the second skid, said landing gear comprising a rear cross-member provided with a first rear descending branch connected to the first skid and a second rear descending branch connected to the second skid. The cross-members may be continuous or discontinuous.

Therefore, said two first rollers may be positioned respectively in line with the first front descending branch and the first rear descending branch, said two second rollers being positioned respectively in line with the second front descending branch and the second rear descending branch.

This arrangement allows the rollers to be positioned as close as possible to the point where forces are introduced into the cross-members that are deformed during a landing phase. This arrangement prevents parasitic bending moments from being introduced into the skids. In the case of a landing gear of patent FR 2 749 561, the distribution of moments between the cross-members and the skids are not modified.

According to one possibility compatible with the preceding possibility, said at least two first rollers may be housed at least partially in respective first housings of the first skid open towards the ground when the landing gear is resting on the ground, said at least two second rollers being housed at least partially in respective second housings of the second skid open towards the ground when the landing gear is resting on the ground.

The rollers are thus in contact with the ground while being protected by the corresponding skids.

According to one possibility compatible with the preceding possibilities, each free-wheel of said at least two first free-wheels and at least two second free-wheels may comprise an inner ring arranged in an outer ring as well as at least one movable member arranged between the inner ring and the outer ring, the inner ring or the outer ring of a free-wheel of a corresponding skid comprising one blocker for each movable member for securing the inner ring and the outer ring together when the corresponding skid tends to move towards the other skid, one of the inner ring and the outer ring being secured to the corresponding roller and the other inner or outer ring not secured to the roller being connected to a longitudinal bearing part of the corresponding skid.

For example, the outer ring is secured to the corresponding roller and the inner ring is connected to a longitudinal bearing part of the corresponding skid.

For example, a blocker is in the form of a face of the outer ring that is capable of clamping the movable member between the outer ring and the inner ring in order to immobilize the roller when the corresponding skid tends to move towards the other skid.

A movable member may be in the form of a ball, a roller or a ratchet, for example.

Moreover, each ring that is not secured to a roller is fixed in rotation about the axis of rotation of the associated roller on itself. The ring may therefore be described as "fixed" and immobilizes the associated roller when the corresponding skid tends to move towards the other skid. The other ring may in contrast be described as "movable".

According to one possibility compatible with the preceding possibilities, said two first rollers may respectively be arranged around two first inner rings of the two first free-wheels, the two first inner rings being connected to the first skid, said two second rollers being respectively arranged around two second inner rings of the two second free-wheels, the two second inner rings being connected to the second skid.

According to one possibility compatible with the preceding possibilities and a first embodiment, at least one or indeed each roller may have a fixed nutation angle.

Therefore, at least one first roller may have a first axis of rotation on itself that is fixed with respect to the first skid.

The first roller therefore has a substantially fixed position relative to the first skid, allowing for assembly clearance. The ring of the first free-wheel that is not secured to the associated first skid may also have a substantially fixed position relative to the first skid. The first roller therefore has only one degree of rotational freedom about its first axis of rotation relative to the first skid.

For example, said first axis of rotation may be parallel to a first longitudinal extension axis of a first longitudinal bearing part of the first skid. The nutation angle is then zero.

According to another example, said first axis of rotation may have an angle different from 0 and 90 degrees with respect to a geometric axis parallel to this first longitudinal extension axis, in a braking configuration, and, for example, a nutation angle of the order of 45 degrees according to the convention described above.

The use of first rollers with respective first axes of rotation parallel to the first longitudinal extension axis may facilitate the deformation of the landing gear on the ground during the sink phase.

Conversely, the use of first rollers with respective first axes of rotation that are angularly offset from the first longitudinal extension axis may help immobilize the landing gear on a moving landing area.

According to one possibility compatible with the preceding possibilities and the first embodiment, said two first rollers may have respective first axes of rotation on themselves that are parallel.

According to one possibility compatible with the preceding possibilities and the first embodiment, at least one second roller may have a second axis of rotation on itself that is fixed with respect to the second skid.

The second roller therefore has a substantially fixed position relative to the second skid, allowing for assembly clearance. The ring of the second free-wheel that is not secured to the associated second skid may also have a substantially fixed position relative to the second skid. The second roller therefore has only one degree of rotational freedom about its second axis of rotation relative to the second skid.

According to one possibility compatible with the preceding possibilities and the first embodiment, said second axis of rotation may be parallel to a second longitudinal extension axis of a second longitudinal bearing part of the second skid, or may have an angle different from 0 and 90 degrees with respect to a geometric axis parallel to the second longitudinal extension axis, for example having a nutation angle of the order of 45 degrees according to the convention described above.

The use of second rollers with respective second axes of rotation parallel to the second longitudinal extension axis may facilitate the deformation of the landing gear on the ground during the sink phase.

Conversely, the use of second rollers with respective second axes of rotation that are angularly offset from the second longitudinal extension axis may help immobilize the landing gear on a moving landing area.

According to one possibility compatible with the preceding possibilities and the first embodiment, said two second rollers may have respective second axes of rotation on themselves that are parallel.

According to an example of the first embodiment, each first and second roller may have an axis of rotation parallel to the longitudinal extension axis of the associated skid. All the rollers are substantially pivoted at 0 degrees with respect to the corresponding skids, having nutation angles of zero with respect to the skids.

According to another example of the first embodiment, said first axis of rotation of a first roller may have an angle different from 0 and 90 degrees with respect to a geometric axis parallel to the first longitudinal extension axis, and said second axis of rotation of a second roller may have an angle different from 0 and 90 degrees with respect to a geometric axis parallel to the second longitudinal extension axis, said first axis of rotation not being parallel to the second axis of rotation. For example, the first axes of rotation of the first rollers of the first skid may be parallel to each other, the second axes of rotation of the second rollers of the second skid being parallel to each other but not parallel to the first axes of rotation. The first rollers may, for example, be inclined at approximately 45 degrees with respect to the first skid according to a first direction viewed from above, whereas the second rollers may, for example, be inclined at approximately 45 degrees with respect to the second skid according to a second direction viewed from above.

According to one possibility compatible with the preceding possibilities and a second embodiment, at least one or indeed each roller may have a variable nutation angle with the ability to pivot in relation to the corresponding skid.

Therefore, at least one first free-wheel may be carried by a first support in pivotal connection with the first skid about a first pivot axis situated in a first transverse plane orthogonal to a first longitudinal extension axis of a first longitudinal bearing part of the first skid, at least one second free-wheel being carried by a second support in pivotal connection with the second skid about a second pivot axis situated in a second transverse plane orthogonal to a second longitudinal axis of a second longitudinal bearing part of the second skid. The pivot axes do not coincide with the respective axes of rotation.

This architecture helps to optimize the orientation of the roller in question in relation to the corresponding skid, according to requirements.

The rings of the free-wheels that are not secured to the associated rollers are then able to pivot in relation to the corresponding skid.

The landing gear may possibly comprise at least one actuator connected to at least one of the first support and second support. The actuator then allows the orientation of at least one roller to be adjusted in relation to the corresponding pivot axis.

All the free-wheels may possibly be carried by respective supports that can be pivoted in relation to the corresponding skid, each one possibly being associated with at least one actuator. The same actuator may possibly act on several supports.

Thus, the axes of rotation of the rollers can be rotated during a landing phase in order to give the rollers nutation angles of zero. On the ground, the axes of rotation of the rollers can be rotated to give substantially different nutation angles of 0 and degrees in relation to the corresponding skid, in order to immobilize the landing gear, or 90 degrees in order to allow the aircraft to be moved on its landing gear.

Some rollers may be arranged according to the first embodiment and other rollers arranged according to the second embodiment.

According to one possibility compatible with the preceding possibilities, and irrespective of the embodiment, at least one of said rollers may comprise a tire intended to be in contact with the ground, said tire being made from a material from the group of elastomers.

Such a material may increase the coefficient of friction of the roller on the ground in order to limit the risk of bouncing.

According to one possibility compatible with the preceding possibilities, and irrespective of the embodiment, at least one of the free-wheels may be releasable.

The free-wheel may then comprise a system that can be released in a manual or motorized manner in order to release the associated roller on the ground following a landing phase.

According to one possibility compatible with the preceding possibilities, and irrespective of the embodiment, at least one free-wheel may be provided with a brake.

The disclosure also relates to an aircraft provided with such a landing gear.

The disclosure also relates to a method for limiting the bounce of a landing gear during a landing phase with such a landing gear, the landing gear being provided with a first skid and a second skid.

This method therefore comprises, during a landing phase, positioning at least two first ground-contact rollers mounted on two respective first free-wheels connected to the first skid in landing positions preventing the first rollers from moving towards the second skid, and positioning at least two second ground-contact rollers mounted on two respective second free-wheels connected to the second skid in landing positions preventing the second rollers from moving towards the first skid.

The method may optionally comprise, during a phase following the landing phase, positioning the at least two first rollers and the at least two second rollers either in respective rolling positions allowing the landing gear to roll along the ground or in respective braking positions limiting the sliding of the landing gear on the ground.

BRIEF DESCRIPTION OF THE DRAWINGS

The disclosure and its advantages appear in greater detail in the context of the following description of embodiments given by way of illustration and with reference to the accompanying figures, wherein:

FIG. 2 is a side view of a non-pivoting roller;

FIG. 3 is a cross-sectional side view of the roller according to FIG. 2;

DETAILED DESCRIPTION

Elements that are present in more than one of the figures are given the same references in each of them.

Three directions X, Y and Z orthogonal to each other are shown in FIGS. 1 to 10.

The first direction X is referred to as the longitudinal direction. The term "longitudinal" is relative to any direction parallel to the first direction X.

The second direction Y is referred to as the transverse direction. The term "transverse" is relative to any direction parallel to the second direction Y.

Finally, the third direction Z is referred to as the direction in elevation. The term "in elevation" and the term "vertical" are relative to any direction parallel to the third direction Z.

Figure 1:
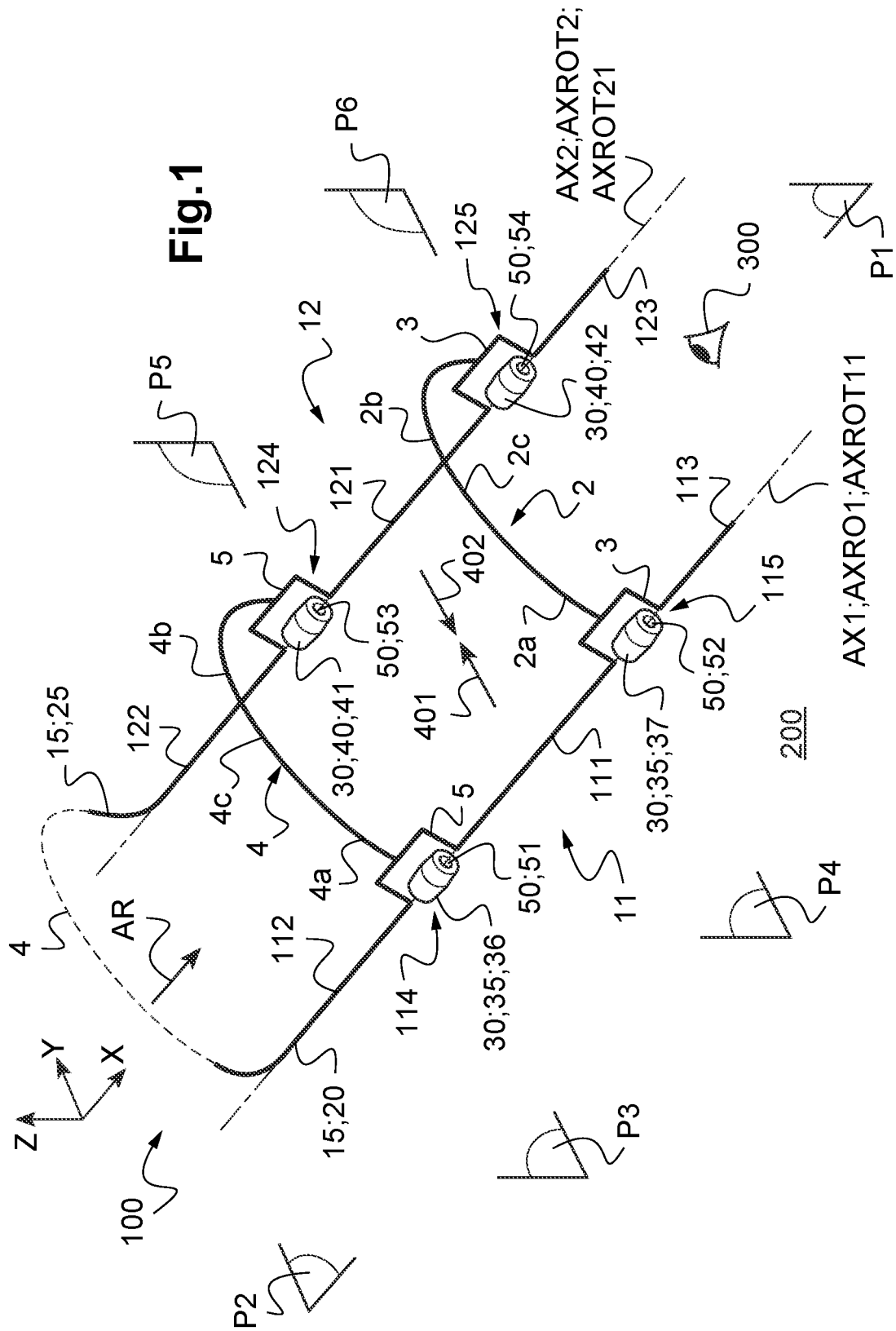
FIG. 1 is a schematic view of an aircraft with a landing gear according to the disclosure.

FIG. 1 shows a rotorcraft 100 according to the disclosure, such as a helicopter, for example. This rotorcraft 100 comprises a structure, that is not shown here, that rests on a landing gear 1. Only the landing gear is illustrated so as not to unduly clutter the figure.

This landing gear 1 comprises a first skid 11 and a second skid 12 intended to be in contact with the ground when the rotorcraft 100 is resting on the ground 200. The term "ground" refers to a surface on which a landing gear may rest, and may cover the ground as such or a landing area of a vehicle or a building, for example.

The first skid 11 and the second skid 12 are respectively arranged transversely to the left and to the right of a longitudinal-vertical plane P1 of symmetry of the rotorcraft 100 or the landing gear 1. "Right" and "left" are defined with respect to an observer 300 looking forwards from behind the landing gear 1.

Each skid 11, 12 is provided with a longitudinal bearing part 111, 121. Thus, the first skid 11 is provided with a first longitudinal bearing part 111, the second skid 12 being provided with a second longitudinal bearing part 121. Each of the first longitudinal bearing part 111 and the second longitudinal bearing part 121 extends longitudinally, in a rearward direction AR of an intrinsic longitudinal axis AX1, AX2, from a front end 112, 122 to a rear end 113, 123.

Therefore, the first skid 11 comprises a first longitudinal bearing part 111 extending longitudinally along a first longitudinal extension axis AX1. In particular, the first longitudinal bearing part 111 extends in the rearward direction AR from a front end referred to as the "first front end 112" to a rear end referred to as the "first rear end 113". The first longitudinal bearing part 111 may be in the form of a hollow tube, for example with a circular cross-section.

Similarly, the second skid 12 comprises a second longitudinal bearing part 121 extending longitudinally along a second longitudinal axis AX2. In particular, the second longitudinal bearing part 121 extends in the rearward direction AR from a front end referred to as the "second front end 122" to a rear end referred to as the "second rear end 123". The second longitudinal bearing part 121 may be in the form of a hollow tube, for example with a circular cross-section.

The second longitudinal bearing part 121 and the first longitudinal bearing part 111 may be identical and/or arranged symmetrically to either side of the longitudinal-vertical plane P1.

Moreover, the first longitudinal bearing part 111 and the second longitudinal bearing part 121 may together define a lift plane P2 on which the landing gear 1 rests on flat ground, i.e., on ground that is horizontal in the terrestrial reference frame.

Moreover, each skid 11, 12 may comprise a member known as a "front portion 15".

Thus, the first skid 11 comprises a front portion 15 referred to as the "first front portion 20". The first front portion 20 extends forwards and upwards from the first longitudinal bearing part 111. The first longitudinal bearing part 111 is therefore extended in a forward direction by the first front portion 20.

Similarly, the second skid 12 comprises a front portion referred to as the "second front portion 25". The second front portion 25 extends forwards and upwards from the second longitudinal bearing part 121. The second longitudinal bearing part 121 is therefore extended in a forward direction by the second front portion 25.

Each front portion 15 may thus protrude longitudinally towards the front from the corresponding longitudinal bearing part 111, 121.

The first front portion 20 and the second front portion are identical and/or arranged symmetrically to either side of the longitudinal-vertical plane P1.

According to another possible feature, the first skid 11 and the second skid 12 may be transversely connected to a rear cross-member 2. For example, a first rear descending branch 2a and a second rear descending branch 2b of this rear cross-member 2 are fastened to the first skid 11 and the second skid 12 respectively by conventional fastening means 3. These fastening means 3 may comprise sleeves, for example.

The rear cross-member 2 may be continuous. A rear top portion 2c is then arranged between the first rear descending branch 2a and the second rear descending branch 2b of the rear cross-member 2. The rear top portion 2c of the rear cross-member 2 may then be fastened to the structure of the rotorcraft 100 via at least one conventional fastening means.

Alternatively, the rear cross-member 2 may be discontinuous and then has no rear top portion 2c. Each rear descending branch 2a, 2b is then fastened to the structure via at least one conventional fastening means.

The first skid 11 and the second skid 12 may be transversely connected to a front cross-member 4. The front cross-member 4 has a first front descending branch 4a fastened to the first skid 11 by a conventional connecting piece 5, for example a sleeve. Moreover, the front cross-member 4 has a second front descending branch 4b fastened to the second skid 12 by a conventional connecting piece 5, for example a sleeve.

The front cross-member 4 may be discontinuous or continuous, comprising a front top portion 4c arranged between the first and second front descending branches 4a, 4b or fastened to the structure of the rotorcraft 100 via at least one conventional fastening means.

The first skid 11, the second skid 12, the front cross-member 4 and the rear cross-member 2 may each comprise a single tube or several tubes assembled together.

According to another aspect, the front cross-member 4 may be fastened to each skid 11, 12 substantially between the front end of each skid 11, 12 and the rear cross-member 2, or may extend between the two aforementioned front portions according to the example shown with dotted lines.

Moreover, the landing gear 1 comprises a plurality of ground-contact rollers 30 carried by the first skid 11 and the second skid 12, and in particular at least one roller referred to as the "first roller 35" carried by the first skid 11 and at least one roller referred to as the "second roller 40" carried by the second skid 12. Reference number 30 is used to refer to any roller, reference numbers 35, 36, 37, 40, 41, 42 being used to refer to specific rollers.

Each roller 30 may comprise a tire 31 forming a tread. The tire 31 may be made of a material from the group of elastomers so as to maximize the coefficient of friction of the tread. The tire may be frustoconical barrel-shaped in order to correctly locate the ground force and limit resistive pivot torque, if the need arises.

Each roller 30 is able to rotate on itself about an axis of rotation.

According to another feature, each roller 30 is mounted on a free-wheel 50 connected to a skid 11, 12. Reference 50 denotes any free-wheel, references 51, 52, 53, 54 denoting specific free-wheels 50 when required. Each free-wheel 50 is configured to allow the roller 30 it carries to rotate in only one direction of rotation.

Thus, the landing gear 1 comprises at least two first rollers 36, 37 mounted on two free-wheels referred to as "first free-wheels 51, 52" respectively, or comprises only two first rollers 36, 37. Each first free-wheel 51, 52 is then carried by the first skid 11 or by its first longitudinal bearing part 111.

Each first free-wheel 51, 52 is then configured to lock the first carried roller 36, 37, during an elastic return phase of a landing phase, when the first skid 11 moves in a first direction 401 from the first skid 11 towards the second skid 12, and to allow the first roller 36, 37 to rotate about its axis of rotation AXROT1, AXROT11 during movement in a second direction 402 opposite the first direction 401, during a sink phase of the landing phase. When landing, the elastic return phase follows the sink phase.

Similarly, the landing gear 1 comprises at least two second rollers 41, 42 mounted on two free-wheels referred to as "second free-wheels 53, 54", or comprises only two second free-wheels 53, 54. Each second free-wheel 53, 54 is then carried by the second skid 12 or by its second longitudinal bearing part 121.

Each second free-wheel 53, 54 is then configured to lock the second carried roller 41, 42, during the elastic return phase, when the second skid 12 moves in the second direction 402, and conversely to allow the second roller 41, 42 to rotate about its axis of rotation AXROT2, AXROT21 during the sink phase, during movement in the first direction 401.

During the sink phase of a landing phase, the first skid 11 may tend to move away from the second skid 12 in the second direction 402, the second skid 12 tending to move away from the first skid 11 in the first direction 401. The cross-members 2, 4 become deformed, storing energy, the rollers 30 rolling on the ground 200. At the end of this movement, during the elastic return phase, the free-wheels 50 tend to brake or even prevent the return of the first skid 11 and the second skid 12 towards each other to a stable position, by locking the rollers 30.

Optionally, the two first rollers 36, 37 are positioned respectively in alignment with the first front descending branch 4a and the first rear descending branch 2a, at their connections 3 with the first skid 11.

Optionally, the two second rollers 41, 42 are positioned respectively in alignment with the second front descending branch 4b and the second rear descending branch 2b, at their connections 3 with the second skid 12.

According to another feature, a roller 30 may be housed in a housing of a skid 11, 12, or of its longitudinal bearing part 111, 121.

The two first rollers 36, 37 can therefore be housed at least partially in two respective first housings 114, 115 of the first skid 11. Each first housing 114, 115 is open towards the ground 200 when the landing gear 1 is resting on the ground 200.

The two second rollers 41, 42 may be housed at least partially in two respective second housings 124, 125 of the second skid 12. Each second housing 124, 125 is open towards the ground 200 when the landing gear 1 is resting on the ground 200.

FIG. 2 shows a view of a roller 30 carried by a skid 11, 12.

FIG. 3 is a cross-sectional side view of FIG. 2 and shows an example of a particular arrangement of a roller 30. The roller 30 may be one of the first rollers 36, 37, or one of the second rollers 41, 42.

Irrespective of the embodiment, the free-wheel 50 and the roller 30, a free-wheel 50 may comprise an inner ring 55 arranged in an outer ring 56.

The inner ring 35 extends along the axis of rotation AXROT1, AXROT11, AXROT2, AXROT21, of the carried roller 36, 37, 41, 42, which axis of rotation AXROT1, AXROT11, AXROT2, AXROT21, may be an axis of symmetry of the inner ring 55.

One of the inner rings 55 and outer ring 56 may be referred to as a "fixed ring", i.e., it may be substantially stationary in relation to the associated axis of rotation, whereas the other ring is referred to in contrast as the "movable ring". The movable ring is then secured to the associated roller, the fixed ring being connected to the corresponding skid by a fixed or pivoting support, depending on the embodiment.

According to the examples shown, the inner ring 55 may be the fixed ring. Furthermore, the inner ring 55 is fastened to the associated skid 11, 12 by a support. The outer ring 56 is then the movable ring secured to the roller 30 in a conventional manner.

The reverse is also possible, the outer ring being connected to the corresponding skid by a fixed or pivoting support, the inner ring being secured to the associated roller.

Furthermore, and irrespective of the nature of the movable and fixed rings, the free-wheel 50 comprises at least one movable member 57 cooperating with a blocker 58. The movable member 57 is arranged between the inner ring 55 and the outer ring 56, the inner ring 55 or the outer ring 56 comprising one blocker 58 per movable member 57. The blocker 58 and the movable member 57 secure the inner ring 56 and the outer ring 57 in rotation about the associated axis of rotation, when the corresponding skid 11, 12 tends to move towards the other skid. Since the inner ring 55 is fixed in relation to the associated axis of rotation, according to the examples given, the roller 30 cannot rotate about this axis of rotation.

According to the example shown, a movable member 57 is in the form of a rolling member arranged between two bearings 59, the blocker 58 being in the form of an inner face of the outer ring 56 capable of clamping the roller between it and the inner ring 55 depending on the direction of movement of the associated skid 11, 12. Alternatively, any type of free-wheel is possible, the free-wheel 50 being a ratchet free-wheel, for example.

According to one possibility, a free-wheel 50 may also be releasable in a manual or motorized manner. Such a free-wheel may comprise a motor that sets the inner ring 55 in motion, a movable cage that carries the rolling members, etc. Reference can be made to the literature for examples of releasable free-wheels.

In these conditions, according to the examples shown, the two first rollers 36, 37 are arranged respectively around two first inner rings 55 of the two first free-wheels 51, 52 so as to be able to rotate about two respective axes of rotation AXROT1, AXROT11, the two first inner rings 55 being connected to the first skid 11. The two second rollers 41, 42 are arranged respectively around two second inner rings 55 of the two second free-wheels 53, 54 so as to be able to rotate about two respective axes of rotation AXROT2, AXROT21, the two second inner rings 55 being connected to the second skid 12.

According to another feature and a first embodiment, the fixed ring of a free-wheel 50, i.e., the inner ring 55 according to the example provided, may be fastened to the associated skid 11, 12 by a support that is fixed with respect to this skid 11, 12. For example, the support comprises an inverted U-shaped clevis carrying the inner ring 55 and attached to a longitudinal bearing part 111, 121.

Therefore, at least one first roller 36, 37 or indeed each first roller 50 may have a first axis of rotation AXROT1, AXROT11 on itself that is fixed with respect to the first skid 11. At least one second roller 41, 42 or indeed each second roller may have a second axis of rotation AXROT2, AXROT21 on itself that is fixed with respect to the second skid 12.

The two first rollers 36, 37 may have respective parallel first axes of rotation AXROT1, AXROT11 on themselves and/or the two second rollers 41, 42 have respective parallel second axes of rotation AXROT2, AXROT21 on themselves.

Figure 4:
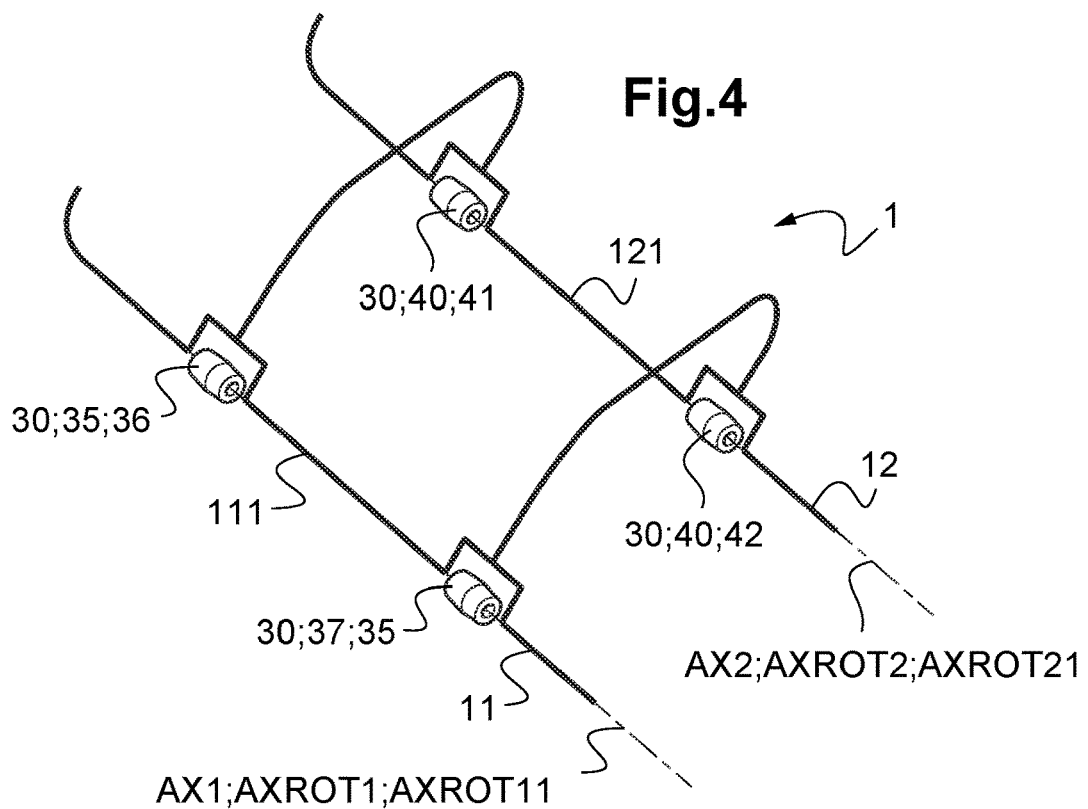
FIG. 4 is a schematic view of an example of a landing gear according to the disclosure with non-pivoting rollers.
Figure 5:
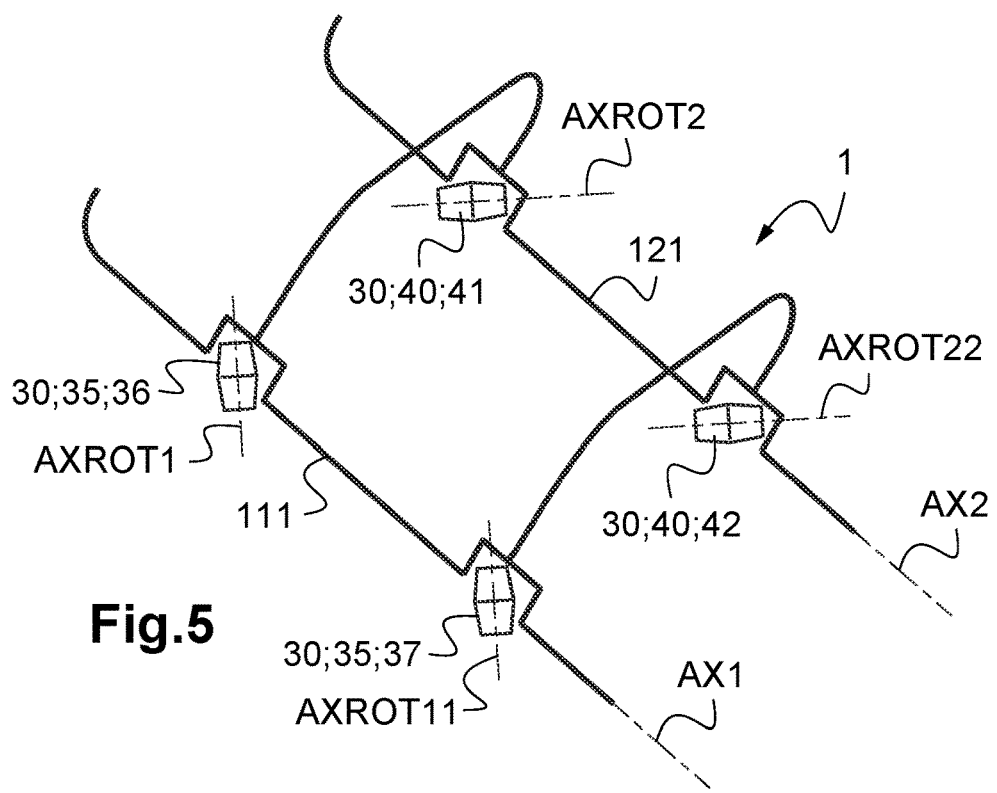
FIG. 5 is a schematic view of an example of a landing gear according to the disclosure with non-pivoting rollers.

FIGS. 4 and 5 show examples of landing gear with rollers comprising fixed clevises according to the first embodiment.

According to FIG. 4, at least one roller 50 may have an axis of rotation parallel to the longitudinal extension axis AX1, AX2 of the corresponding longitudinal bearing part 111, 121.

For example, each first roller 36, 37 comprises a respective first axis of rotation AXROT1, AXROT11 parallel to the first longitudinal extension axis AX1. The first rollers 36, 37 each have a nutation angle of zero, and therefore an orientation of zero degrees relative to the longitudinal extension axis AX1 of the first longitudinal bearing part 111, and therefore relative to the first skid 11.

For example, each second roller 41, 42 comprises a respective second axis of rotation AXROT2, AXROT21 parallel to the second longitudinal extension axis AX2. The second rollers each have a nutation angle of zero, and therefore an orientation of zero degrees relative to the longitudinal extension axis AX2 of the second longitudinal bearing part 121, and therefore relative to the second skid 12.

According to FIG. 5, at least one roller 50 may have an axis of rotation that has an acute angle of between 0 and 90 degrees and, for example, of the order of 45 degrees plus or minus 10%, with respect to a geometric axis parallel to the longitudinal extension axis AX1, AX2 of the corresponding longitudinal bearing part 111, 121.

For example, each first roller 36, 37 comprises a first axis of rotation AXROT1, AXROT11 that has an acute nutation angle of between 0 and 90 degrees, not inclusive, with respect to the first longitudinal extension axis AX1. The first rollers 36, 37, for example, have a nutation angle of substantially 45 degrees with respect to the first skid 11 according to FIG. 5 and the previously described convention.

For example, each second roller 41, 42 comprises a second axis of rotation AXROT2, AXROT21 that has a nutation angle of between 0 and 90 degrees, not inclusive, with respect to the second longitudinal extension axis AX2. The second rollers 36, 37, for example, have a nutation angle of 45 degrees with respect to the second skid 12 according to FIG. 5 and the previously described convention.

Possibly, no first axis of rotation AXROT1, AXROT11 is parallel or orthogonal to a second axis of rotation AXROT2, AXROT21.

Figure 6:
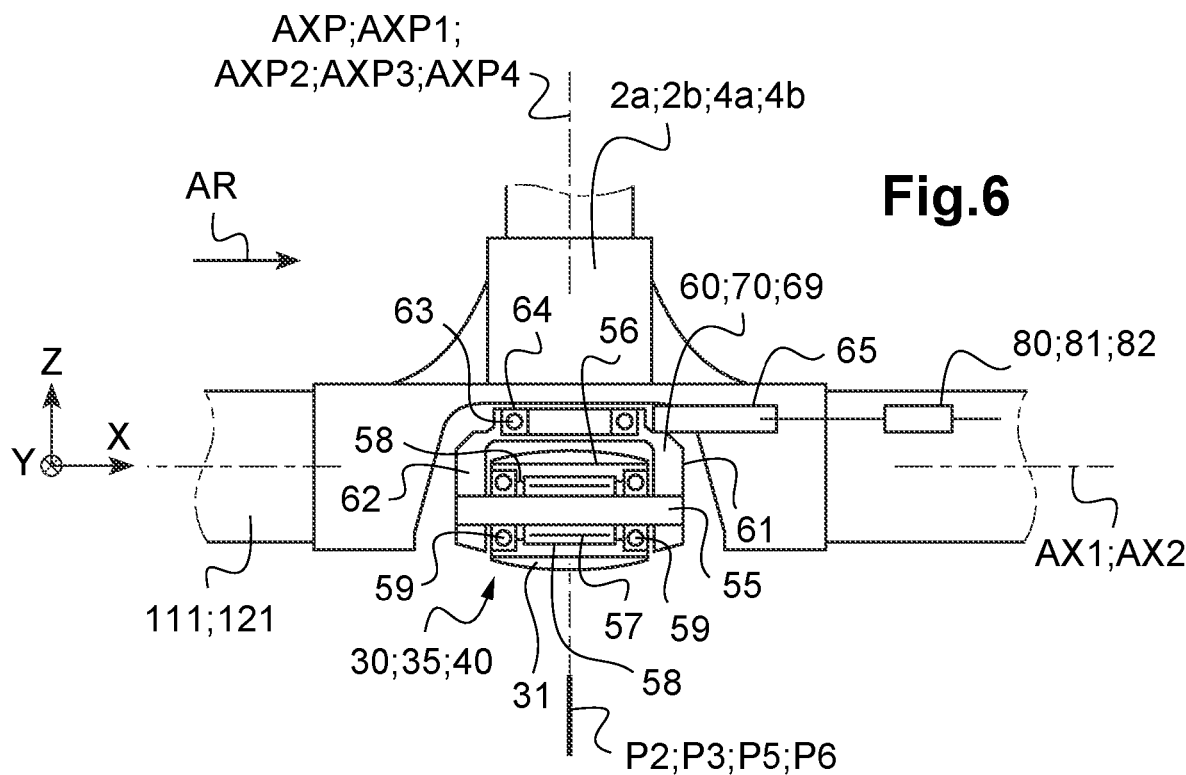
FIG. 6 is a cross-sectional side view of a pivoting roller.

According to the embodiment of FIG. 6, that shows a second embodiment, the fixed ring of a free-wheel 50, i.e., the inner ring 55 according to the example provided, may be fastened to the associated skid 11, 12 by a support 60 that is able to pivot with respect to this skid 11, 12. FIG. 6 may represent any free-wheel 50.

Therefore, at least one first roller 36, 37 or indeed each first roller 36, 37 may have a first axis of rotation AXROT1, AXROT11 on itself that is able to pivot with respect to the first skid 11. At least one second roller 41, 42 or indeed each second roller 41, 42 may have a second axis of rotation AXROT2, AXROT21 on itself that is able to pivot with respect to the second skid 11.

For example, the support 60 of a free-wheel 50 may comprise an inverted U-shaped clevis provided with two legs 61, 62 connected by a wall 63, the two legs 61, 62 carrying the inner ring 55 of the free-wheel 50. The wall 63 is then pivotally connected to the associated skid 11, 12 so as to be able to pivot about a pivot axis AXP, by virtue of a bearing 64, for example.

Furthermore, an actuator 80 may be hinged to the skid 11, 12 or to a cross-member 2, 4 and to the support 60, for example to a lever 65 of the support 60. The actuator 80 may be a manual, hydraulic, electric or pneumatic actuator. The actuator 80 may comprise an integrated control or may be linked by a wired or wireless link to a control, in order to be extended or retracted upon request. An operator can therefore maneuver the control in order to rotate the roller 50 in question about a pivot axis AXP.

Figure 7:
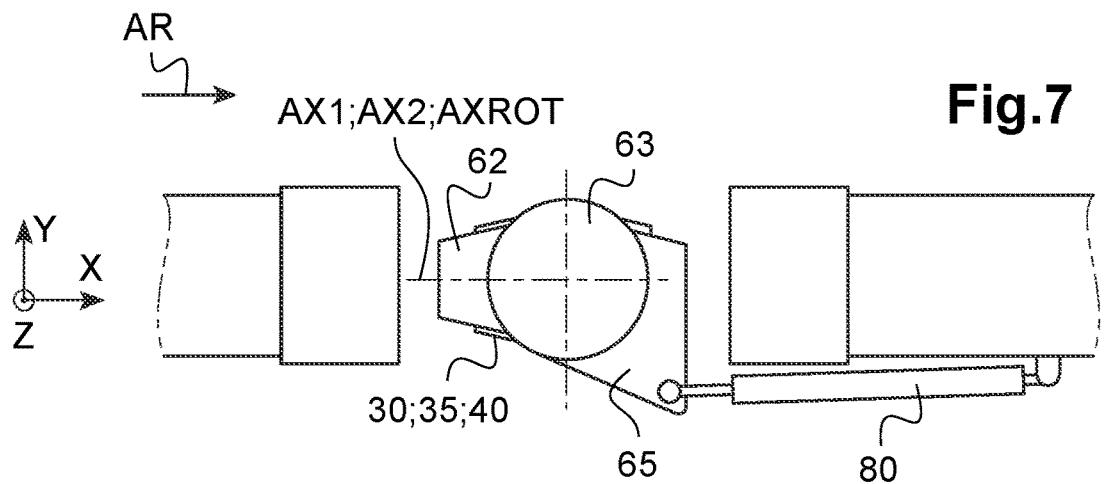
FIG. 7 is a partial view showing the roller of FIG. 6 in a position oriented to have a nutation angle of substantially zero in relation to the corresponding left skid, i.e., in a landing position.

According to FIG. 7, the actuator 80 may act on the support 60 in order to move the roller 30 to a landing configuration, the nutation angle of the roller then being zero. The axis of rotation AXROT of the free-wheel 50 is then in a plane parallel to the longitudinal extension axis AX1, AX2 of the associated skid 11, 12.

Figure 8:
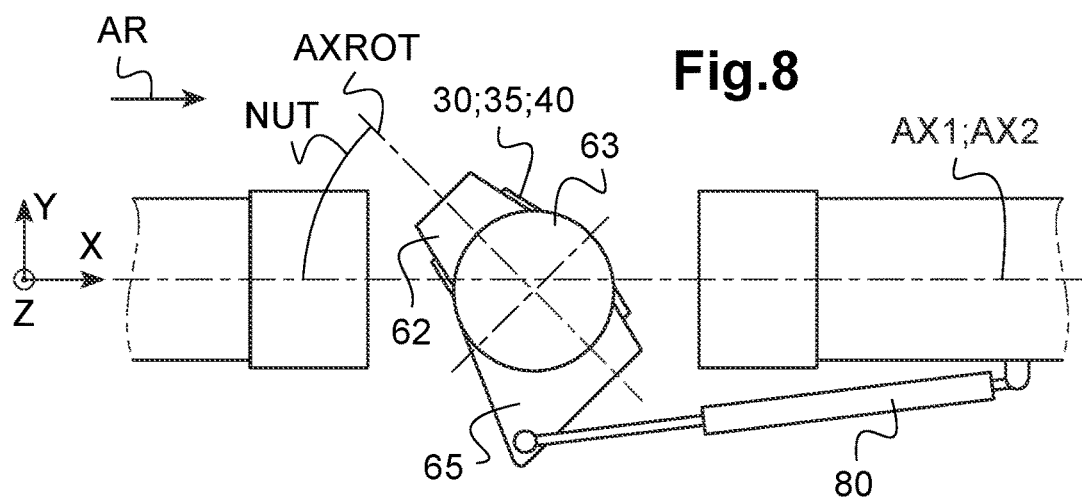
FIG. 8 is a partial view showing the roller of FIG. 6 in a position oriented at substantially 45 degrees in relation to the corresponding left skid, i.e., in a braking position.

According to FIG. 8, the actuator 80 may act on the support 60 in order to move the roller 30 to a braking configuration as described previously, the nutation angle NUT of the roller then being equal to 45 degrees, according to the example shown.

Figure 9:
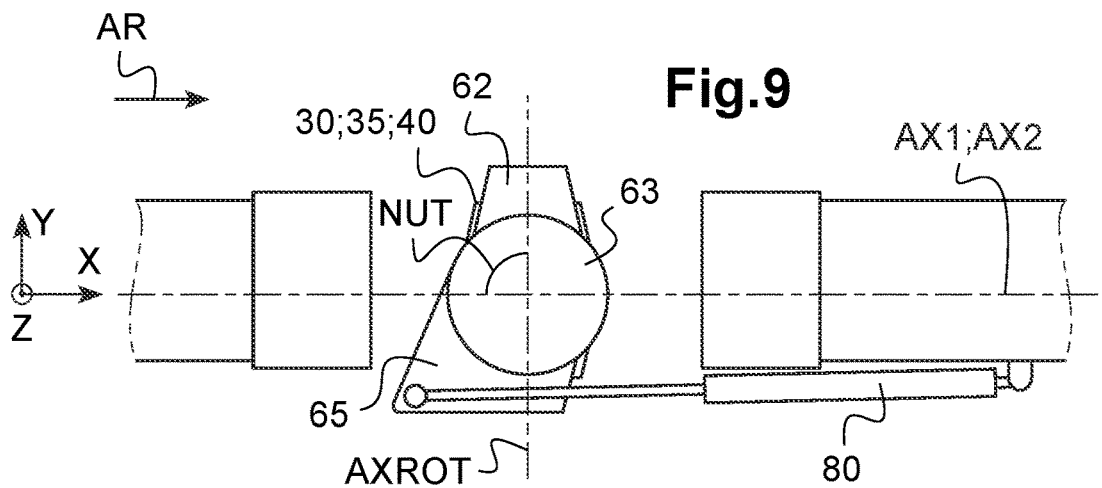
FIG. 9 is a partial view showing the roller of FIG. 6 in a position oriented to have a substantially 90-degree nutation angle in relation to the corresponding left skid, i.e., in a rolling position.

According to FIG. 9, the actuator 80 may act on the support 60 in order to move the roller 30 to a rolling configuration. The nutation angle NUT of the roller is then equal to 90 degrees. The axis of rotation AXROT of the free-wheel 50 is then perpendicular to the longitudinal extension axis AX1, AX2 of the associated skid 11, 12.

Figure 10:
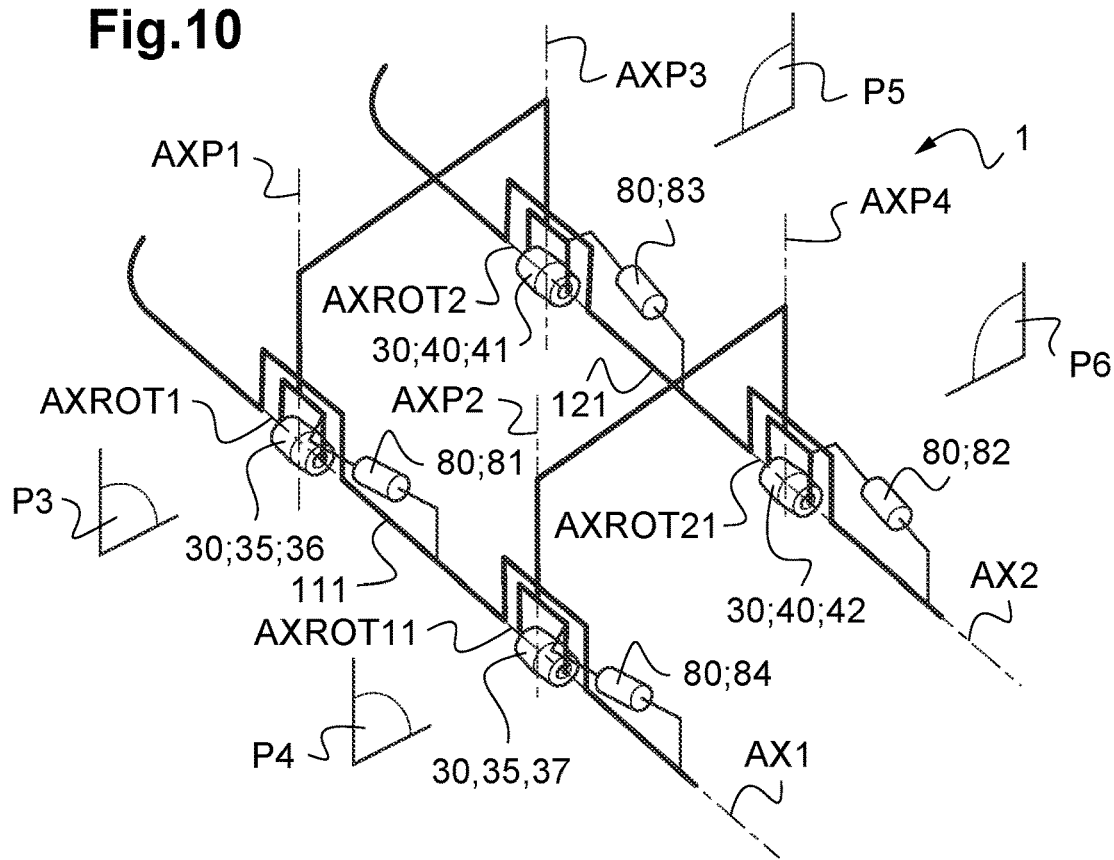
FIG. 10 is a schematic view of an example of a landing gear according to the disclosure with pivoting rollers, i.e., in a landing position.

FIG. 10 shows an example of a landing gear with pivoting rollers according to the second embodiment. At least one roller 50 may have an axis of rotation that is able to pivot in relation to the longitudinal extension axis AX1, AX2 of the corresponding longitudinal bearing part 111, 121.

For example, at least one first free-wheel 50, or indeed each first free-wheel 51, 52, is carried by a first support 69 pivotally connected to the first skid 11 about a first pivot axis AXP1, AXP2, each first pivot axis AXP1, AXP2 being situated in a first transverse plane P3, P4 orthogonal to the first longitudinal extension axis AX1.

At least one second free-wheel 50, or indeed each second free-wheel 53, 54, is carried by a second support 70 pivotally connected to the second skid 12 about a second pivot axis AXP3, AXP4 situated in a second transverse plane P5, P6 orthogonal to the second longitudinal extension axis AX2.

At least one first support 69 may be further connected to a first actuator 81, at least one second support 70 possibly being connected to a second actuator 82. Each support 69, 70 may be connected to its own actuator 80, or one actuator 80 may be connected to several supports 69, 70.

FIG. 10 shows the landing gear in a landing position with the rollers having nutation angles of zero.

Figure 11:
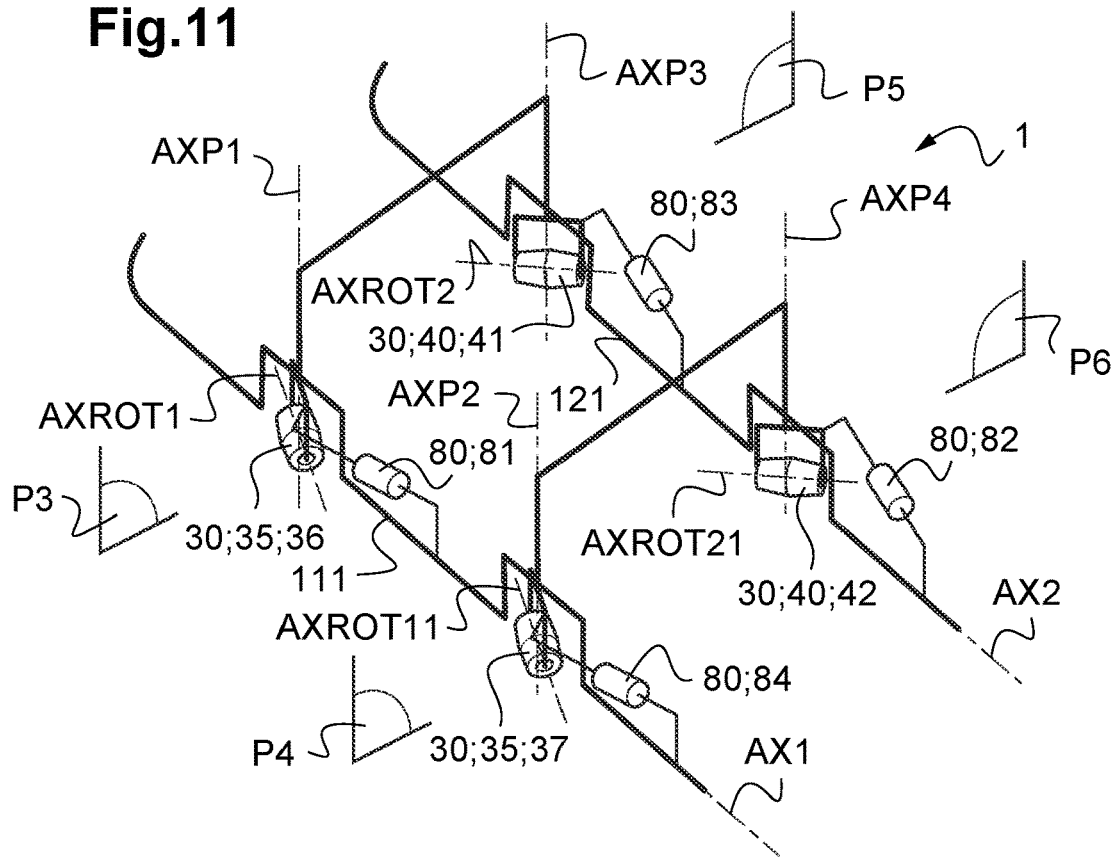
FIG. 11 is a schematic view of the landing gear of Figure in a braking position.

FIG. 11 shows the landing gear in a braking position with first rollers 35 having nutation angles of 45 degrees with respect to the first longitudinal bearing part 111, and second rollers 40 having nutation angles of 45 degrees with respect to the second longitudinal bearing part 121, according to the previously described convention.

Figure 12:
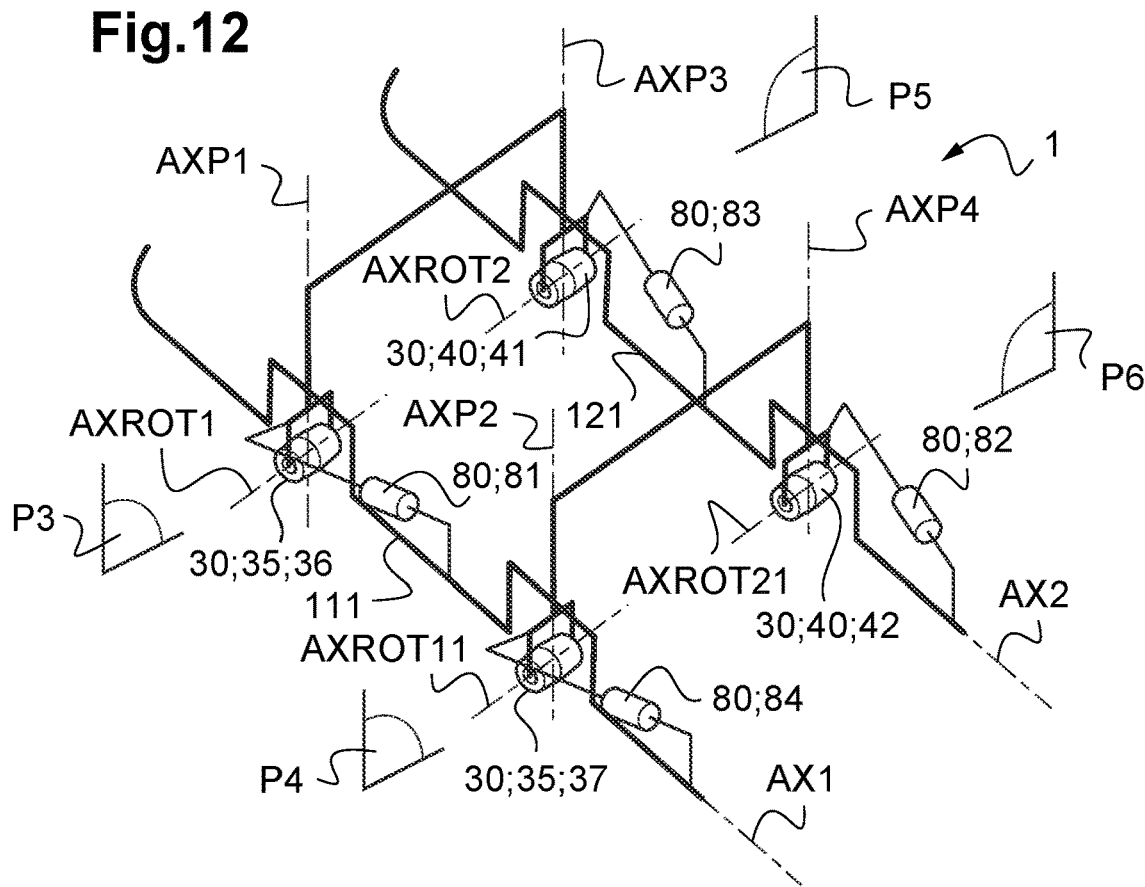
FIG. 12 is a schematic view of the landing gear of Figure in a rolling position.

FIG. 12 shows the landing gear in a rolling position with the rollers having nutation angles of 90 degrees.

FIGS. 13 to 16 show the operation of the disclosure.

Figure 13:
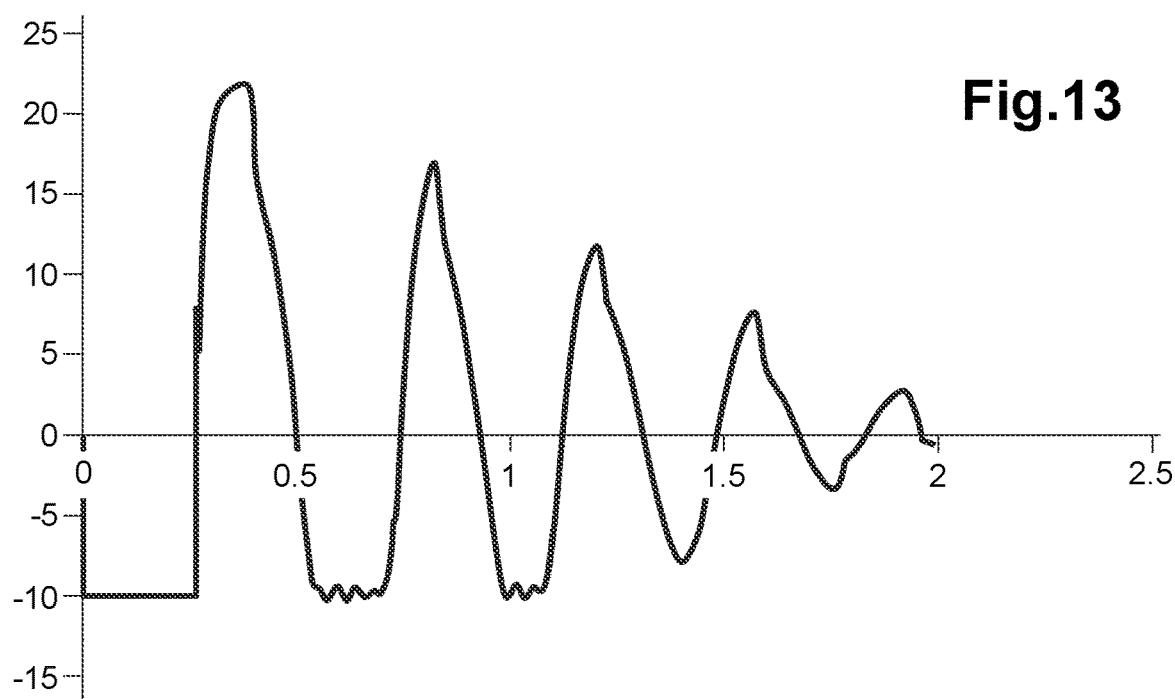
FIG. 13 is a diagram showing an example of vertical accelerations experienced by a skid landing gear without rollers of the prior art during a landing phase.
Figure 14:
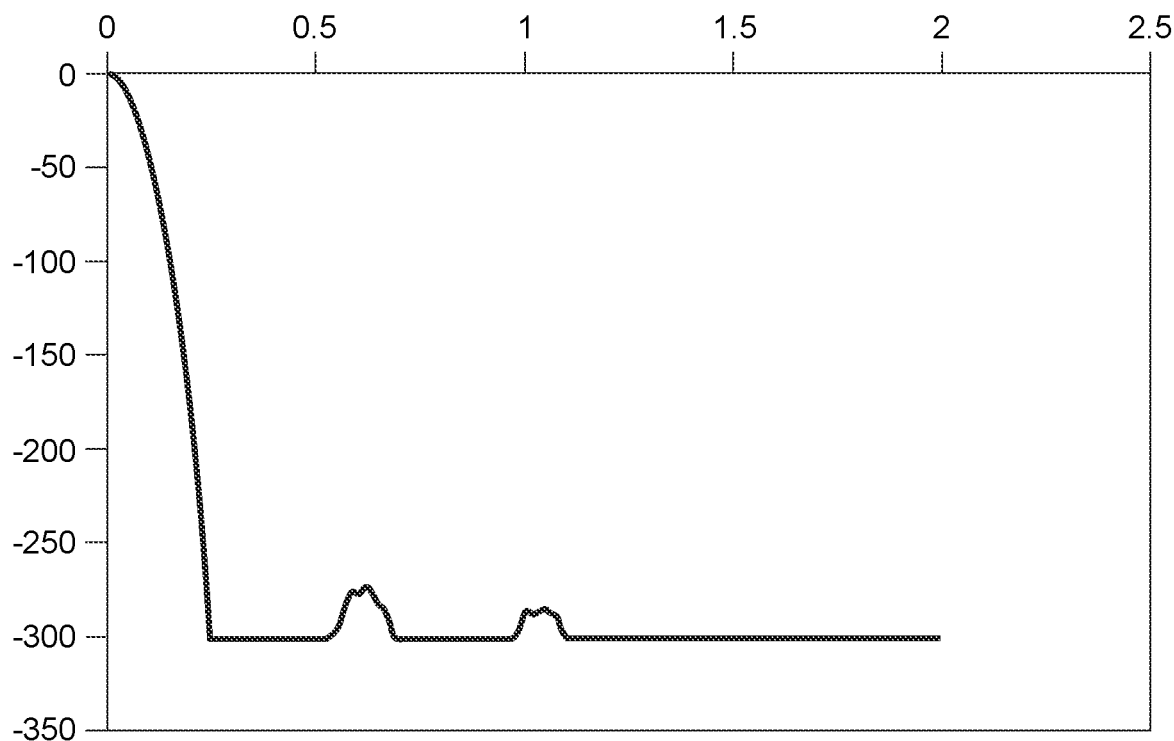
FIG. 14 is a diagram showing the movement of a reference point of the landing gear of FIG. 11 during a landing phase.

FIG. 13 shows a diagram comprising time on the X-axis and, on the Y-axis, the vertical acceleration experienced by an aircraft provided with a landing gear according to the prior art, during a landing phase. FIG. 14 shows a diagram of the movement of the aircraft's center of gravity during this landing. The diagram shows the occurrence of two bounces after 0.5 seconds and 1 second.

The method of the disclosure comprises positioning at least two first rollers 36, 37 in landing positions preventing the first rollers 36, 37 from moving towards the second skid 12, and positioning at least two second rollers in landing positions preventing the second rollers 41, 42 from moving towards the first skid 11.

Figure 16:
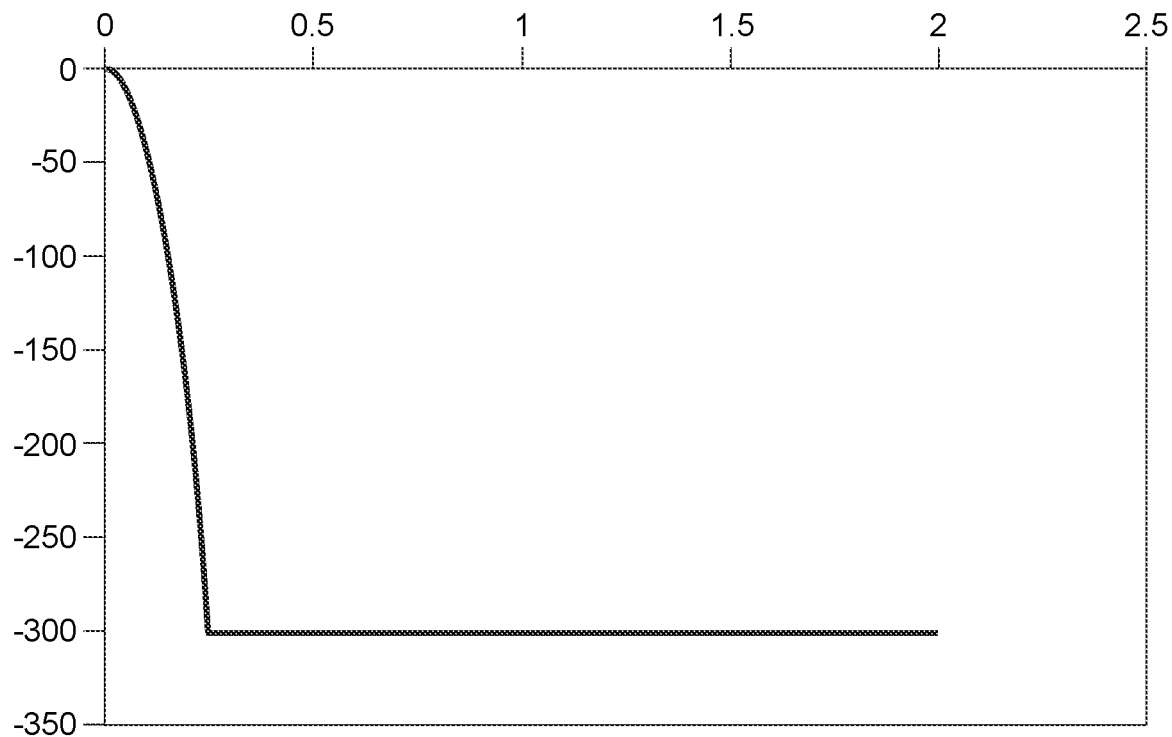
FIG. 16 is a diagram showing the movement of a reference point of the landing gear of FIG. 13 during a landing phase.
Figure 15:
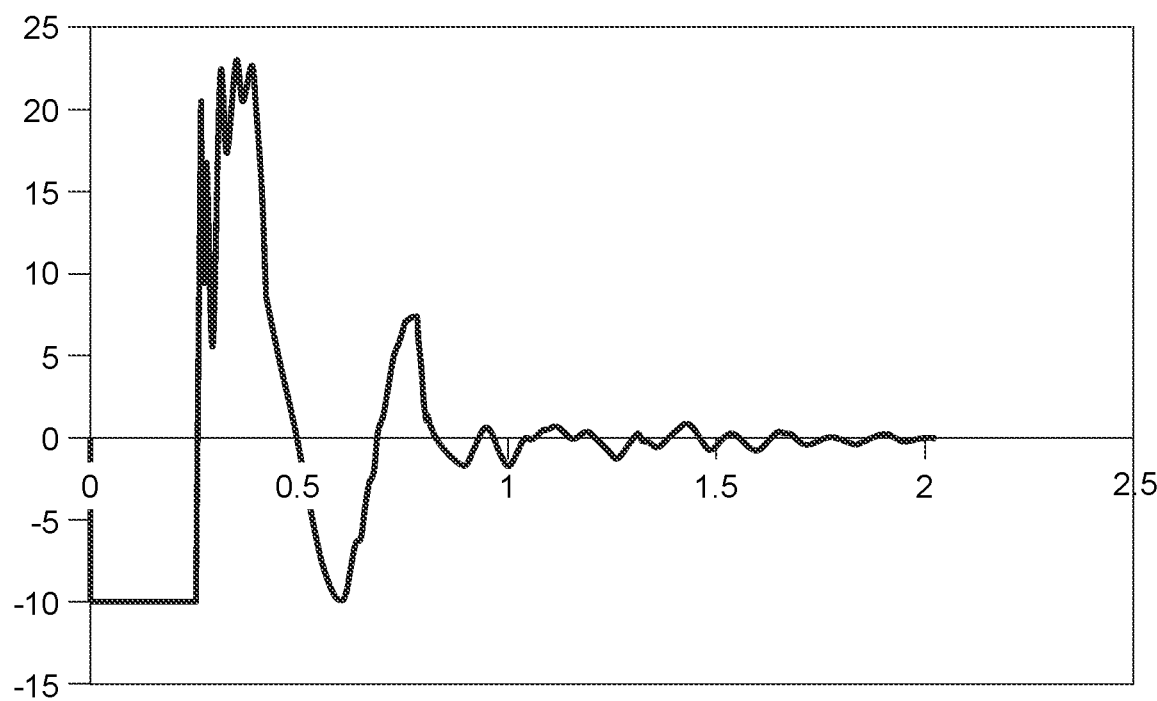
FIG. 15 is a diagram showing an example of vertical accelerations experienced by a skid landing gear with rollers according to the disclosure during a landing phase.

FIG. 15 shows a diagram comprising time on the X-axis and, on the Y-axis, the vertical acceleration experienced by an aircraft provided with a landing gear 1 according to the disclosure, in the same conditions as in FIG. 11. FIG. 16 shows a diagram of the movement of the aircraft's center of gravity during this landing. The rollers 30 prevent bounce from occurring.

During a phase following the landing phase and when movable rollers 30 are fitted, the method may possibly comprise positioning the at least two first rollers 36, 37 and the at least two second rollers 41, 42 either in respective rolling positions allowing the landing gear 1 to move on the ground 200 by rolling, in order to reach a configuration as in FIG. 9, or in respective braking positions preventing the landing gear 1 from moving laterally or longitudinally on the ground 200 by rolling, for example as in FIG. 8.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

For example, the same landing gear may comprise different types of rollers 30, for example at least one fixed roller 30 having an inclination of 0 degrees with respect to the associated skid 11, 12 according to FIG. 4, and/or at least one fixed roller 30 having an inclination of 45 degrees with respect to the associated skid 11, 12 according to FIG. 5, and/or at least one pivoting roller 30 according to FIG. 6.

What is claimed is:

1. A landing gear provided with a first skid and a second skid,
wherein the landing gear comprises at least two first ground-contact rollers mounted on two respective first free-wheels that are connected to the first skid, each first free-wheel being configured to lock during an elastic return phase when the first skid moves in a first direction and to be free during a sink phase when the first skid moves in a second direction opposite the first direction, the first direction extending from the first skid towards the second skid, the landing gear comprising at least two second ground-contact rollers mounted on two respective second free-wheels that are connected to the second skid, each second free-wheel being configured to lock during the elastic return phase when the second skid moves in the second direction and to be free during the sink phase when the second skid moves in the first direction.

2. The landing gear according to claim 1,
wherein, the landing gear comprising a front cross-member provided with a first front descending branch connected to the first skid and a second front descending branch connected to the second skid, the landing gear comprising a rear cross-member provided with a first rear descending branch connected to the first skid and a second rear descending branch connected to the second skid, the two first rollers are positioned respectively in line with the first front descending branch and the first rear descending branch, the two second rollers being positioned respectively in line with the second front descending branch and the second rear descending branch.

3. The landing gear according to claim 1,
wherein the at least two first rollers are housed at least partially in respective first housings of the first skid open towards the ground when the landing gear is resting on the ground, the at least two second rollers being housed at least partially in respective second housings of the second skid open towards the ground when the landing gear is resting on the ground.

4. The landing gear according to claim 1,
wherein each free-wheel of the at least two first free-wheels and at least two second free-wheels comprise an inner ring arranged in an outer ring as well as at least one movable member arranged between the inner ring and the outer ring, the inner ring or the outer ring of a free-wheel of a corresponding skid comprising one blocker for each a movable member for securing the inner ring and the outer ring together when the corresponding skid tends to move towards the other skid, one of the inner ring and the outer ring being secured to the corresponding roller and the other of the inner ring or the outer ring being connected to a longitudinal bearing part of the corresponding skid.

5. The landing gear according to claim 1,
wherein the two first rollers are respectively arranged around two first inner rings of the two first free-wheels, the two first inner rings being connected to the first skid, the two second rollers being respectively arranged around two second inner rings of the two second free-wheels, the two second inner rings being connected to the second skid.

6. The landing gear according to claim 1, wherein at least one of the rollers comprises a tire intended to be in contact with the ground, the tire being made from an elastomeric material.

7. The landing gear according to claim 1,
wherein at least one of the free-wheels is releasable.

8. The landing gear according to claim 1,
wherein at least one first free-wheel is carried by a first support in pivotal connection with the first skid about a first pivot axis situated in a first transverse plane orthogonal to a first longitudinal extension axis of a first longitudinal bearing part of the first skid, at least one second free-wheel being carried by a second support in pivotal connection with the second skid about a second pivot axis situated in a second transverse plane orthogonal to a second longitudinal extension axis of a second longitudinal bearing part of the second skid.

9. The landing gear according to claim 8,
wherein the landing gear comprises at least one actuator connected to at least one of the first support and the second support.

10. The landing gear according to claim 1,
wherein at least one second roller has a second axis of rotation on itself that is fixed with respect to the second skid.

11. The landing gear according to claim 10,
wherein the second axis of rotation is parallel to a second longitudinal extension axis of a second longitudinal bearing part of the second skid, or has an angle different from 0 and 90 degrees with respect to a geometric axis parallel to this second longitudinal extension axis.

12. The landing gear according to claim 10,
wherein the two second rollers have respective second axes of rotation on themselves that are parallel.

13. The landing gear according to claim 1,
wherein at least one first roller has a first axis of rotation on itself that is fixed with respect to the first skid.

14. The landing gear according to claim 13,
wherein the first axis of rotation is parallel to a first longitudinal extension axis of a first longitudinal bearing part of the first skid, or has an angle different from 0 and 90 degrees with respect to a geometric axis parallel to this first longitudinal extension axis.

15. The landing gear according to claim 13,
wherein the two first rollers have respective first axes of rotation on themselves that are parallel.

16. The landing gear according to claim 13,
wherein at least one second roller has a second axis of rotation on itself that is fixed with respect to the second skid and wherein the first axis of rotation has an angle different from and 90 degrees with respect to a geometric axis parallel to the first longitudinal extension axis, and the second axis of rotation has an angle different from 0 and 90 degrees with respect to a geometric axis parallel to the second longitudinal extension axis, the first axis of rotation not being parallel to the second axis of rotation.

17. An aircraft,
wherein the aircraft comprises the landing gear according to claim 1.

18. A method for limiting bounce of landing gear during a landing phase, the landing gear being provided with a first skid and a second skid, the method comprising:

during a landing phase, positioning at least two first ground-contact rollers mounted on two respective first free-wheels connected to the first skid in landing positions preventing the first rollers from moving towards the second skid, and positioning at least two second ground-contact rollers mounted on two respective second free-wheels connected to the second skid in landing positions preventing the second rollers from moving towards the first skid; and during a phase following the landing phase, positioning the at least two first rollers and the at least two second rollers either in respective rolling positions allowing the landing gear to slide on the ground or in respective braking positions preventing the landing gear from sliding on the ground.

\* \* \* \* \*